Patented Feb. 1, 1927.

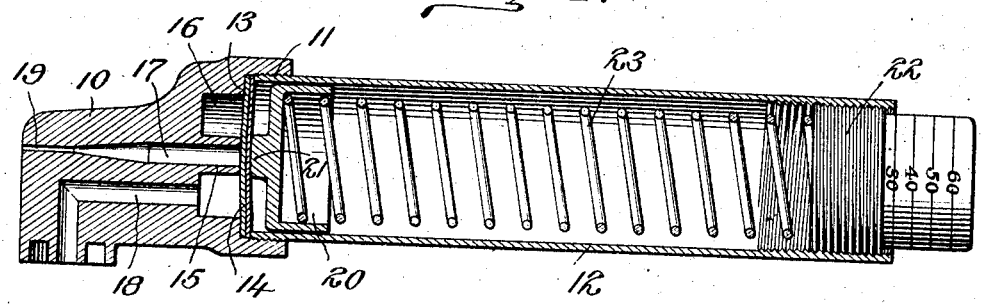
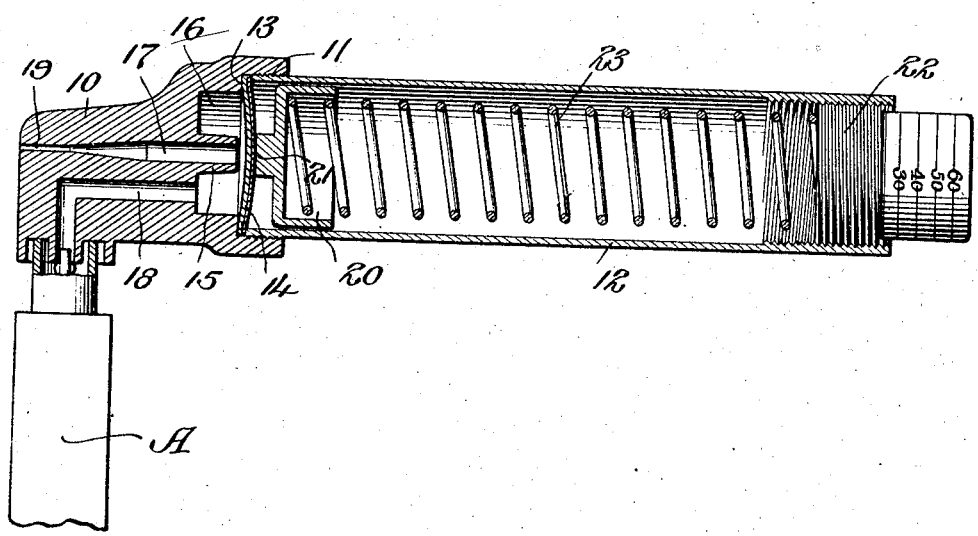

1,616,032

UNITED STATES PATENT OFFICE.

JAMES T. DUFFY, OF SAN ANTONIO, TEXAS.

PRESSURE GAUGE.

Application filed September 3, 1925. Serial No. 55,154.

My invention relates to improvements in pressure gauges for use in inflating pneumatic tires, particularly balloon tires, which require accurate inflation to certain predetermined pressures to obtain the best results therefrom, my purpose being to provide a simple, accurate, inexpensive gauge which will exhaust air placed in a tire under excess pressure, to a lower predetermined pressure, and which will thereafter operate automatically and instantaneously to prevent further exhaust of air, whereby the exact pressure desired in a tire may be secured, and whereby each of a number of tires may be inflated to the same exact pressure.

I accomplish the foregoing purpose by providing a gauge so constructed that when the pressure in a tire has been reduced to the exact pressure desired the gauge will operate promptly to prevent further reduction in pressure by bleeding.

It is also my purpose to provide a gauge of the kind mentioned including means whereby it may be adjusted to function at different predetermined pressures.

With the foregoing and other purposes in view, my invention consists in the novel features of construction, combination and arrangement of parts as will be described more fully hereinafter, illustrated in the accompanying drawings, and defined in the appended claims.

In the drawings, wherein like characters of reference denote corresponding parts in the different views:—

Fig. 1 is a longitudinal section through a tire gauge constructed in accordance with my invention, and showing the normal status of its parts; and Fig. 2, a view similar to Fig. 1 showing how the gauge operates to exhaust air from a tire.

By reference to the drawings it will be observed that my improved gauge in its present embodiment includes essentially a head 10, having an opening 11 formed in one side thereof into which is threaded one end of a tube 12, said opening being reduced to provide a shoulder 13 against which is seated a diaphragm 14, clamped at its marginal edges against said shoulder by the inner end of tube 12. Diaphragm 14 overlies a boss 15 surrounded by an air chamber 16 formed in head 10 as a continuation of opening 11 and into which opens a pair of passages 17 and 18, the first of which is formed through said boss and the second of which opens directly into the base of said chamber. Passage 17 leads to the atmosphere and either has a restricted port 19 or is formed throughout of less cross-sectional area than passage 18, while passage 18 leads through one side of the head 10 where it is surrounded by a flange or any other desired means adapted to be engaged with the stem of an ordinary tire valve A to open such valve and permit air to flow from the tire (not shown) equipped with said valve through the passage 18 into chamber 16.

Within tube 12 is arranged a plunger 20 having a projection 21 on the side thereof adjacent the diaphragm 14, bearing against said diaphragm at the point where the latter overlies boss 15, and reacting against said plunger from a plug 22 threaded in the outer end of said tube is an expansion coil spring 23 which operates through said plunger and the projection 21 thereon to maintain the diaphragm 14 normally seated against the end of boss 15 in closing relation to passage 17.

Plug 22, as is obvious, constitutes a means of adjusting the pressure of spring 23, and to this end it is provided with suitable graduations cooperating with the end of tube 12 so that a person using the gauge, simply by screwing said plug inward or outward, may compress said spring or allow it to expand to vary the pressure with which diaphragm 14 is held against boss 15.

In operation, air is first supplied through valve A to the tire in an ordinary well known manner until the pressure in the tire is in excess of the desired pressure. My gauge then is applied to the valve as indicated in Fig. 2, opening the same and allowing the air therein to flow through passage 18 into air chamber 16. The pressure of the air in the tire, being greater than the pressure of spring 23 which latter has of course been adjusted by means of plug 22 to the pressure desired in the tire, acting against diaphragm 14, overcomes said spring and moves the diaphragm off of the end of boss 15. This allows the air in chamber 16 to escape to the atmosphere through restricted port 19, and because of said restricted port, which allows the air to escape more slowly from said chamber than it flows into same through the relatively large passage 18, a head of air is maintained against diaphragm 14 to hold it open with respect to passage 17 until the pressure of the air in the tire has been reduced to such an extent that spring 23 functions as shown in Fig. 1 to move the diaphragm against boss 15 and close passage 17, at which time further exhaust of air promptly ceases. Thus it is apparent that, due to restricted port 19, bleeding of air from the tire through valve A is prevented for the reason that, immediately the pressure in chamber 16 is reduced below the pressure of spring 23, diaphragm 14, which acts as a valve in association with boss 15, closes passage 17 and prevents further escape of air, only a very small amount of air at the most being able to escape through said restricted port during the time required for closing of passage 17 by the diaphragm following a reduction in pressure within chamber 16 below the pressure of spring 23, so that extreme accuracy is assured.

From the foregoing description considered in connection with the accompanying drawings, it is believed that the construction, operation and advantages of my improved gauge will be fully understood. I desire to point out, however, that various changes and desirable additions may be made in and to the same within the spirit and scope of my invention as defined in the appended claims.

I claim:—

1. A tire gauge comprising a head having an air chamber formed therein and provided with a pair of passages opening into said chamber, one for the admission of air thereto and the other for exhaust of air therefrom, a valve member, yieldable means normally holding said valve member in closing relation to said exhaust passage, the cross sectional area of said air admission chamber being considerably greater than the cross sectional area of said exhaust passage and the latter being of minute size, and means at the inlet end of said air inlet passage for engagement with a tire valve to open same when the gauge is operatively applied thereto.

2. A tire gauge comprising a head having an air chamber formed therein and provided with air intake and exhaust passages each of which opens at its inner end into said chamber and at its outer end through said head to the atmosphere, a portion at least of said exhaust passage being of minute cross sectional area and the cross sectional area of said intake passage being considerably greater than the cross sectional area of said exhaust passage, a valve member, yieldable means holding said valve member normally in closing relation to said exhaust passage, said valve member being arranged to be opened with respect to said exhaust passage by the pressure of air in said air chamber, and means at the outer end of said intake passage for engagement with a tire valve to open same when the gauge is operatively engaged with a tire valve.

In testimony whereof I hereunto attach my signature.

JAMES T. DUFFY.